United States Patent [19]

Pennebaker et al.

[11] 4,221,275
[45] Sep. 9, 1980

[54] MOTOR-ASSIST VEHICLE

[76] Inventors: William B. Pennebaker, Box 66, Crane Rd.; Jan P. Hoekstra, 41 N. Gate Rd., both of Carmel, Putnam County, N.Y. 10512

[21] Appl. No.: 900,851

[22] Filed: Apr. 28, 1978

[51] Int. Cl.² ............................................. B62M 7/10
[52] U.S. Cl. ............................... 180/206; 180/220; 180/222; 200/61.12; 250/231 P; 318/376
[58] Field of Search ............... 180/33 C, 33 R, 33 E, 180/34, 65 A, 206, 220, 222; 200/61.12; 318/370, 376; 250/231 P

[56] References Cited

U.S. PATENT DOCUMENTS

| | | | |
|---|---|---|---|
| 3,159,750 | 12/1964 | Kazan | 250/231 P |
| 3,921,745 | 11/1975 | McCulloch et al. | 180/33 C |
| 3,939,932 | 2/1976 | Rosen | 180/33 C |
| 3,983,465 | 9/1976 | Tsubi et al. | 318/376 |
| 3,991,843 | 11/1976 | Davidson | 180/33 C |
| 4,085,814 | 4/1978 | Davidson et al. | 180/33 C |

FOREIGN PATENT DOCUMENTS 785882  5/1968  Canada ................................. 200/61.12

Primary Examiner—John J. Love
Assistant Examiner—Donn McGiehan

[57] ABSTRACT

A control system for a combined pedal and battery powered bicycle or companion vehicle in which sensing means is employed to monitor tension in the chain which couples power from the pedal sprocket to the wheel sprocket of such vehicle in order to provide power from the electrical drive as and when needed; and where similar sensing means is employed to monitor activation of the braking system of the vehicle in order to regeneratively brake the vehicle.

4 Claims, 7 Drawing Figures

MOTOR-ASSIST VEHICLE

BACKGROUND OF THE INVENTION

Electrical propulsion systems for vehicles such as bicycles, tricycles, go-carts, wheel chairs and the like suffer from a limitation in energy storage capabilities of the electrical storage cells used to propel such vehicles. One reason for this is that these vehicles are controlled very inefficiently, the drive system being activated unnecessarily when very modest manual effort would easily propel such a vehicle, and the braking being accomplished by frictional means such that the kinetic energy of the vehicle is not recovered. This invention overcomes this undesirable limitation in such relatively light weight vehicles by using battery assistance in propelling the cycle only when assistance is required to prevent excessive effort by the cycle operator. Such battery-assistance is achieved by employing a sensor that automatically senses the tension of the chain that drives the rear wheel of a cycle during pedalling. In a specific, and serving only as an exemplary, technique for achieving such sensing, a spring-loaded unit in conjunction with an optical interrupter module is employed. The interrupter module acts as a variable resistor to control the duty cycle of a multivibrator, the latter being amplified by suitable pulse circuitry to drive a motor that is linked independently of the chain system to a wheel of the vehicle.

By appropriately adjusting such sensor and pulse circuitry, the motor, during pedalling on flat or level surfaces, will be energized only enough so that it can overcome frictional losses in the drive system. When the pedaller must climb a hill or drive against a strong wind, he must apply greater force to the pedals, and such greater force increases the tension on the drive chain, which increased tension is sensed by the spring-loaded unit and optical system.

The sensed tension increase is translated into an increased motor duty cycle, thus reducing the pedaller's efforts during the hill-climbing or strong head-wind interval. This use of the driving motor only when needed greatly increases the life of the battery.

When the pedaller wishes to brake the vehicle, this is accomplished either by the depression of hand levers or by reversing the direction of pedalling. The reversed tension in the chain or the tension in the linkage operated by the hand levers is sensed by a sensor similar to that described for controlling power to the motor. The sensed tension is translated into a sequence of pulses which short the motor terminals for brief periods of time. The large currents which develop in the motor windings cause braking action, and, as a result of the nature of the shorting action and control circuit, repetitively decay through the battery, thereby recharging the battery.

Consequently, it is a principle object of this invention to provide a manually operated vehicle with an electric motor that will automatically assist an operator of said vehicle during those periods when extra exertion is needed to propel the vehicle, which extra exertion is either uncomfortable or exceedingly difficult to achieve.

It is yet another object to provide an electronic circuit that is compatible with the electric motor to be used on such a cycle so as to preserve the life of the battery operating such motor.

It is yet another object to provide a regenerative braking system that is controlled by action of the normal braking unit on the bicycle so as to provide a smooth and controlled braking action.

Further objects and advantages of the invention will become apparent as the following description proceeds, and the features of novelty which characterize this invention will be pointed out with particularity in the claims annexed to and forming part of this specification.

DESCRIPTION OF THE PREFERRED EMBODIMENT OF THE INVENTION

Figure 1:
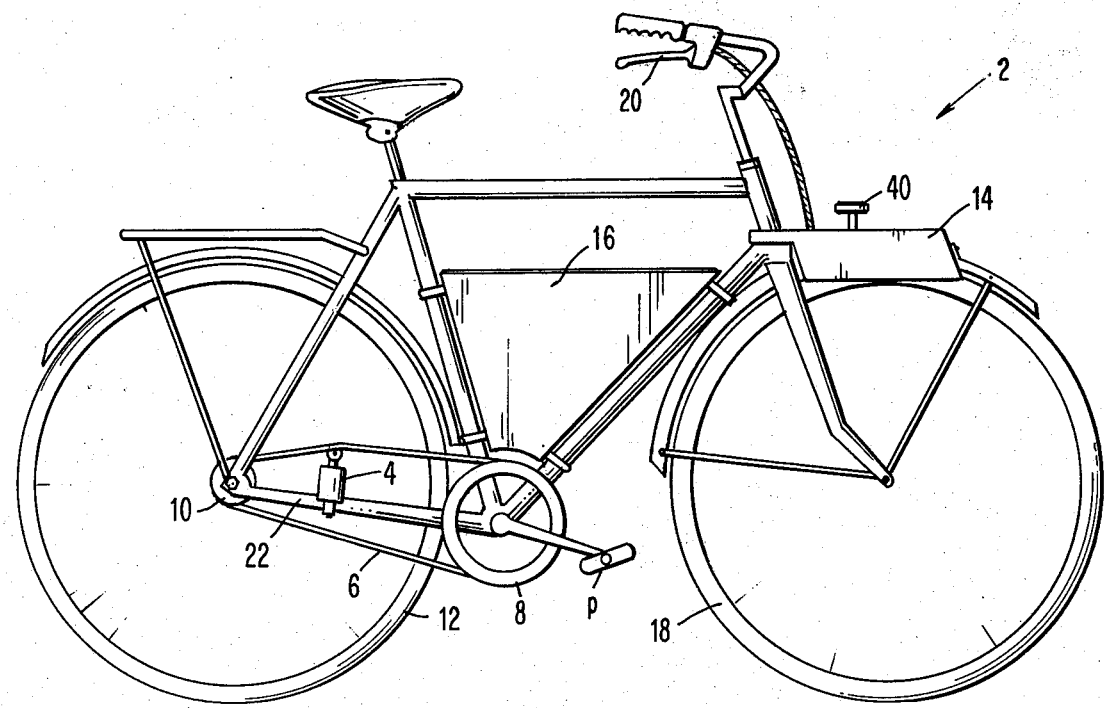
FIG. 1 is an overall showing of the invention.

As seen in FIG. 1, a conventional bicycle 2 is equipped with the features of this invention, namely, a sensor 4 that is connected to the drive chain 6 that couples the pedal wheel 8 to a gear 10 of the rear wheel 12 of the bicycle 2. Such sensor 4 is responsive to the tension of drive chain 6 and changes in position of an element in such sensor 4 causes an electrical signal proportional to the drive chain tension to be sent to electronic circuitry 14, which activates an electric motor (not seen in FIG. 1 because it is hidden by the electronic circuitry box 14.) The energy source for such motor is battery 16. The motor drives front wheel 18 so that two separated but related simultaneous drives occur, one is the driving of the rear wheel 12 by pedal action and one is the driving of the front wheel 18 by motor action.

When the operator must slow down the bicycle 2, a brake handle(s) or lever(s) 20 is depressed so that, as will be described in detail hereinafter, the motor is then used as a generator, converting the kinetic energy of the bicycle 2 to electrical energy for charging battery 16. Since the braking system is a regenerative one, when the bicycle 2 is slowing down to a halt, the regenerative braking system becomes ineffective so that the mechanical braking action is the one that takes effect through handle 20.

Figure 5A:
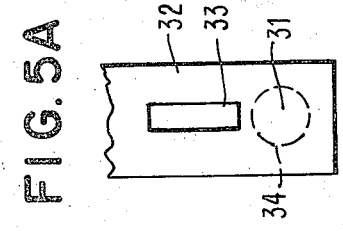
FIG. 5a is a detailed showing of the finger element included in FIG. 5.
Figure 5:
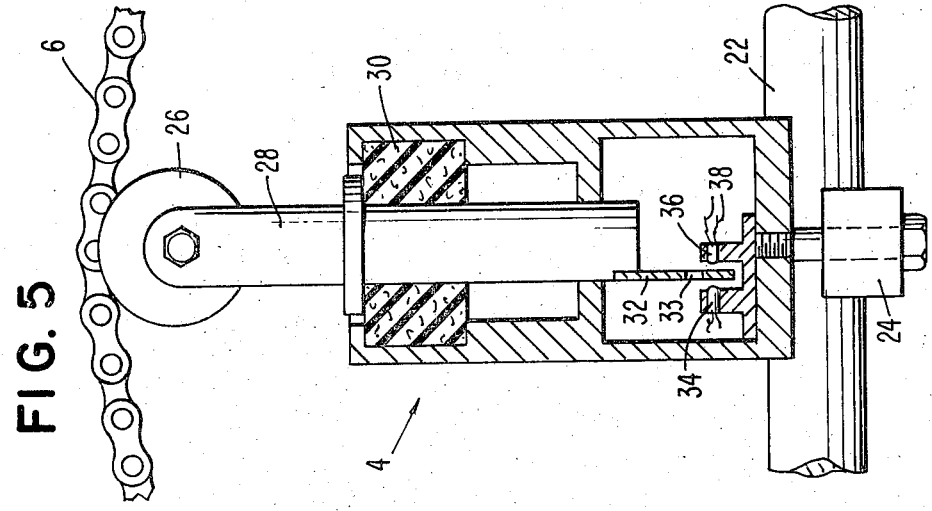
FIG. 5 is a showing of a sensor element used in carrying out the invention.

Attention is now directed to FIG. 5 in order to describe details of the operation of sensor 4. The latter is secured to that section of the frame 22 (see FIG. 1) that lies beneath the upper portion of drive chain 6. Any suitable nut and bolt or clamping means 24 can be used to affix or securely position the sensor 4 so that a roller 26 is rotatably connected to vertically movable shaft 28 and also nests under drive chain 6. A rubber spring 30 dampens the vibrations being imparted to the sensor during normal driving of the bicycle 2. The vertically biassed shaft 28 has, at its lower extremity, a narrow plunger or finger 32 whose downward movement permits the passage of light from light-emitting diode 34 to a light sensor or phototransistor 36.

Figure 3:
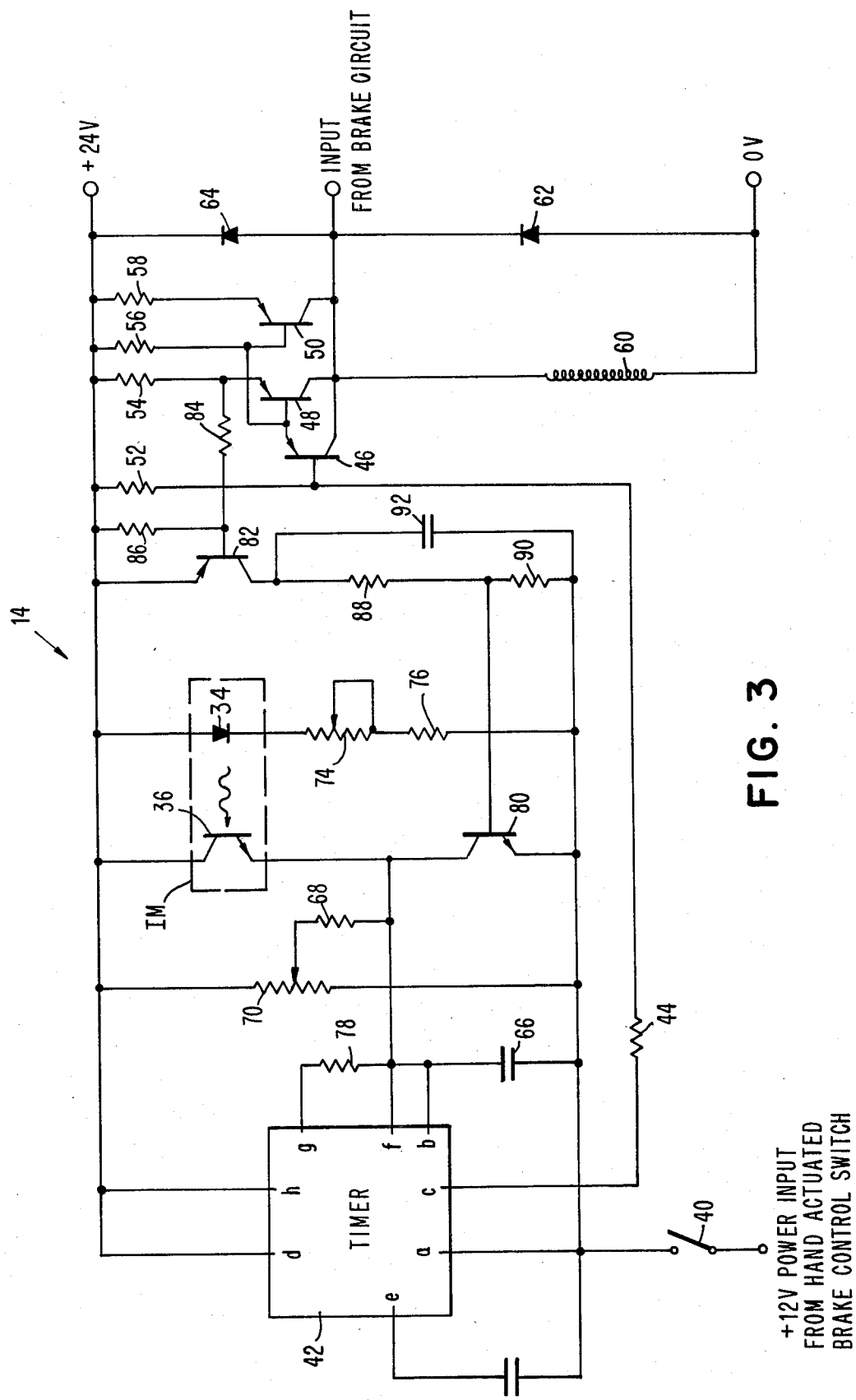
FIG. 3 is a detailed showing of the operation of the sensor, pulse circuitry and power transistor network that form a major portion of the invention.

As seen in FIG. 5a, which is a side view of finger 32 (see FIG. 5), the lower portion 31 of the finger 32 is opaque to the light that is coming from light-emitting diode 34 so that during normal pedalling no light goes to phototransistor 36. When drive chain 6 tension increases, finger 32 is pushed down so that slot 33 lies between light-emitting diode 34 and detector 36; thus greater chain tension will produce more light transmission through slot 33. How such change in phototransistor current going through leads 38 affects the motor drive electronic circuitry 14 can be better understood by referring to FIG. 3 and employing a description of the operation of that Figure.

When a hand activated power switch 40, which can be located anywhere that is convenient on the body of bicycle 2 shown in FIG. 1, is closed, a 12 volt potential from a 24 volt battery source 16 is applied across the terminals of a commercial pulse circuit 42 shown as a SN72 555 timer circuit that is manufactured by Texas Instruments Inc., and other semiconductor manufacturers. The output of pulse circuit 42 is connected by means of resistor 44 to a high current pulse amplifier consisting of transistors 46, 48 and 50 and resistors 52, 54, 56 and 58 connected in a well known circuit called the Darlington configuration. The respective collectors of transistors 46, 48 and 50 are all connected to the positive terminal of a permanent magnet motor 60 and supply current to the latter whenever the output signal of pulse circuit 42 is negative. The positive terminal of motor 60 is also connected to diodes 62 and 64. Diode 62 is a "free wheeling" diode and serves to prevent excessive negative transients from developing at the instant when transistors 46, 48 and 50 are turned off. The role of diode 64 is to prevent excessive reverse bias from developing across transistors 46, 48 and 50 due to generator action of the permanent magnet motor 60 when the latter is rotating at high speeds and also to allow current to pass from motor 60 to battery 16, recharging the latter and preventing excessive vehicle speed. As will be shown hereinafter, diode 64 allows recharging current to charge battery 16 when the bicycle's regenerative braking circuit is activated.

Capacitor 66 of the electronic circuitry, when charging or discharging, controls the pulse frequencies and pulse lengths of timer circuitry 42. Capacitor 66 is charged either through the circuit that includes the phototransistor 36 (which senses chain tension) or through the circuit that includes resistor 68 and potentiometer 70. When the bicycle operator applies increased pressure on the pedals of bicycle 2, plunger 32 is depressed because of increased tension in drive chain 6. Light from light-emitting diode 34, normally blocked off by plunger 32, is now allowed to pass through a phototransistor 36 so as to activate it. Increased current through the latter charges capacitor 66 at a rate that is dependent upon pedal pressure of the cyclist. Current through the diode 34 of the interruptor module that includes phototransistor 36 passes through adjustable resistor 74 and resistor 76. The two adjustable resistors 70 and 74 are employed to suit the individual operator's comfort. Adjustable resistor 70 adjusts the "idling" or pulse rate to the motor 60 in the absence of pedal pressure whereas adjustable resistor 74 adjusts the sensitivity of electronic circuitry to changes in pedal pressure.

The consequences of the two discharge paths of capacitor 66 will now be discussed. One discharge path is from capacitor 66 through resistor 78 to the discharge control point g of timer circuit 42. The respective values of resistor 78 and capacitor 66 control the length of time that the circuit timer 42 is negative which, in turn, determines the length of time that current pulses are applied to rotate motor 60.

The second discharge path for capacitor 66 is through transistor 80 and is employed when wishing to prevent excessively high currents from being drawn by motor 60. Such excessively high currents would most likely be drawn by motor 60 when starting from a stopped position or when climbing a very steep hill, causing damage to transistors 46, 48 and 50 unless prohibitively expensive high current transistors were used to replace transistors 48 and 50.

These excessively high currents are avoided by the discharge path available through transistor 80. Such discharge path from capacitor 66 through transistor 80 occurs when current through the resistor 54 that is in series with the emitter of transistor 48 as well as in series with resistor 84 reaches a value sufficient to turn on transistor 82. With transistor 82 conducting, the current is able to flow through serially connected resistors 88 and 90 so as to turn on transistor 80 and begin charging capacitor 92 positively. The discharge of capacitor 92 through resistor 88 and through the base of transistor 80 keeps the latter turned on for a time delay determined by resistor 88 and capacitor 92. During this time delay, the interruptor module (consisting of phototransistor 36 and 34) is unable to recharge capacitor 66 and initiate a new pulse. Such time delay is required to allow current in motor 60 to decay through diode 62.

Capacitor 92 and resistor 88 form an RC time delay that controls the time between output pulses from timer 42 to motor 60 whenever the current through the motor 60 tends to exceed a preset value. Otherwise the time between output pulses is controlled by the position of potentiometer 70 and phototransistor 36 and diode 34 and such times can range from infinity (with potentiometer 70 set to give no output) to zero (with the motor 60 on continuously).

A braking circuit for the vehicle as well as a battery recharging circuit for that vehicle is part of the present invention. In most cases known to the inventors where regenerative braking is used, such regenerative braking is accomplished either by raising the output voltage of the motor being used or by speeding up the motor. Gearing devices have been used to speed up the motor to achieve higher EMF's, or switches have been provided to switch from a series battery circuit to a parallel battery circuit to reduce the EMF of the battery driving the motor. Such techniques have been found to be either cumbersome or imprecise and are avoided by the use of the present invention. In this invention, regenerative braking is achieved by periodically shorting the terminals of motor 60 with a transistor switching device. When the motor terminals are shorted, the internal electro-motive force of the motor causes a current to flow through the motor windings 60 which is reversed from the direction of current flow when the motor is powered by the external battery source 16. The reversed current causes the motor to generate a reversed torque on the drive wheel 18, thereby causing a braking action. When the shorting action is terminated, the inductive reactance of the motor 60 causes a voltage transient which, in turn, causes current to be returned to the battery 16 through a diode. By repeating this process at a frequency determined by the ratio of motor inductance to circuit resistance, effective regenerative braking is obtained.

Figure 4:
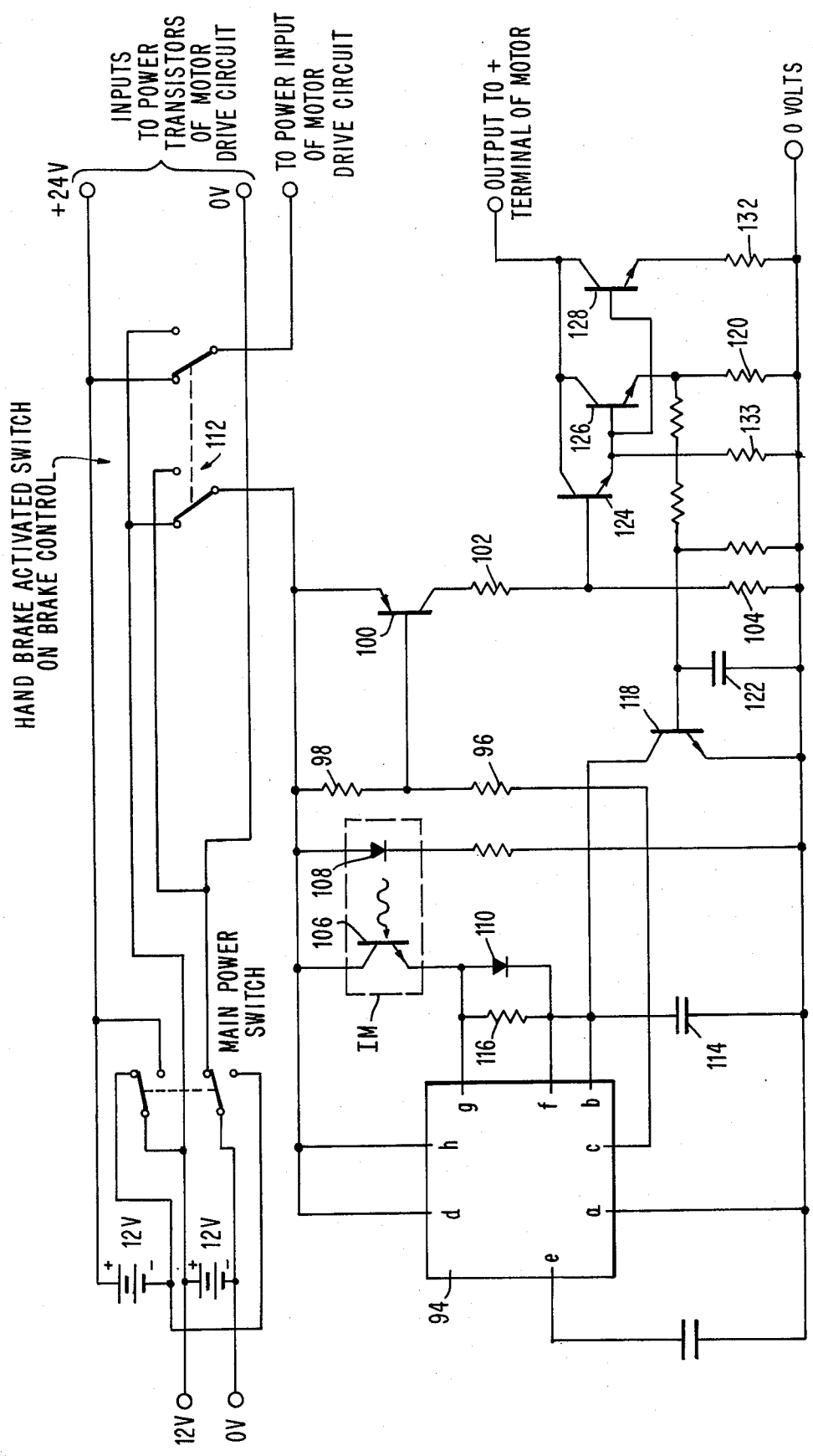
FIG. 4 is a showing of the braking circuit for use with this invention.

FIG. 4 illustrates how such regenerative braking is provided. The operation of the regenerative braking circuit is similar in some respects to the motor drive circuit of FIG. 3 in that a conventional, commercially available pulse circuit 94, identical to "555" Timer 42 of FIG. 2, supplies negative pulses through resistors 96 and 98, respectively, in order to turn on p-n-p transistor 100. The latter, in series with resistors 102 and 104, respectively, controls the Darlington configuration consisting of transistors 124, 126 and 128 and resistors 133, 120 and 132. When turned on, the Darlington network short circuits the permanent magnet of the motor, and when the Darlington network is then turned off, the current is not able to decay instantly owing to the inductance of motor 60. As a result, a positive voltage develops at the terminals of motor 60, allowing motor 60 current to decay through diode 64 into battery 16 (see FIG. 3).

Substantial charging action is obtained by shorting the terminals of motor 60 through the Darlington network at a frequency comparable to 1/LR, where LR is the time constant for current decay, given by the product of motor inductance and the total resistance of motor 60, circuit elements and battery 16. The above frequency represents the frequency at which substantial braking or recharging currents can be obtained. The actual braking current desired is controlled by means of current through the interruptor module IM that is comprised of phototransistor 106 and diode 108 and current through diode 110. Interruptor module IM is attached to hand brake lever 20 (see FIG. 1) as well as to switch 112, the latter being capable of switching power from the motor drive circuit 14 to the brake circuit so as to prevent both circuits from being activated simultaneously.

The upper limit to both drive pulse frequency and braking pulse frequency is controlled by the switching time of power transistors. If the pulse interval is too close to the transistor switching time, too much power is dissipated in the transistors.

Discharge of capacitor 114 occurs either through that discharge path that includes resistor 116 or through transistor 118. Current in transistor 118 is turned on when current in resistor 120 reaches about 20 amperes, so that transistor 118 performs the same current limiting function in the braking circuit as do transistors 80 and 82 in the motor drive circuit of FIG. 3. Such limiting current serves to protect both the motor 60 and its circuit from excessive currents and also limits braking torque to safe levels as well as adjusting the braking pulse length to provide more recharging current for the battery 16. The role of capacitor 122 is to prevent transistor 118 from turning off too rapidly.

Figure 2:
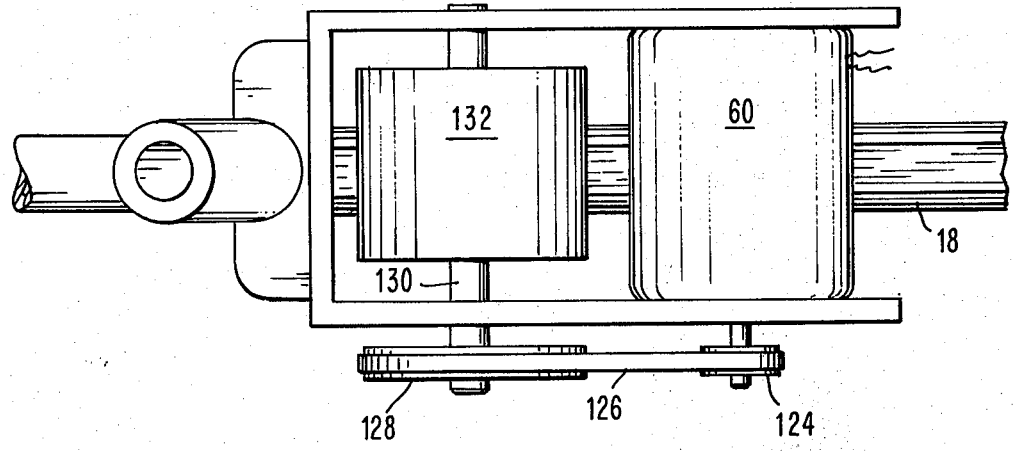
FIG. 2 is a generalized showing of how an electric motor applies driving power to a wheel of a cycle.

FIG. 2 is a view looking down on the front wheel 18 to which is applied motor power, when needed, to assist the pedaller during cycling. It is understood that motor power could be applied to the rear wheel, if desired. Front wheel drive is meant to be exemplary and not limiting. Motor 60 drives a gear 124 to which is attached a belt 126. Belt 126 is also attached to gear 128 that is carried by a spindle 130 to roller 132, the latter applying a frictional engagement with the tire of wheel 18 so as to apply rotary motion to wheel 18. The housing for the motor 60 and front wheel drive is attached conveniently to the front portion of the bicycle frame as shown in FIG. 1.

Figure 6:
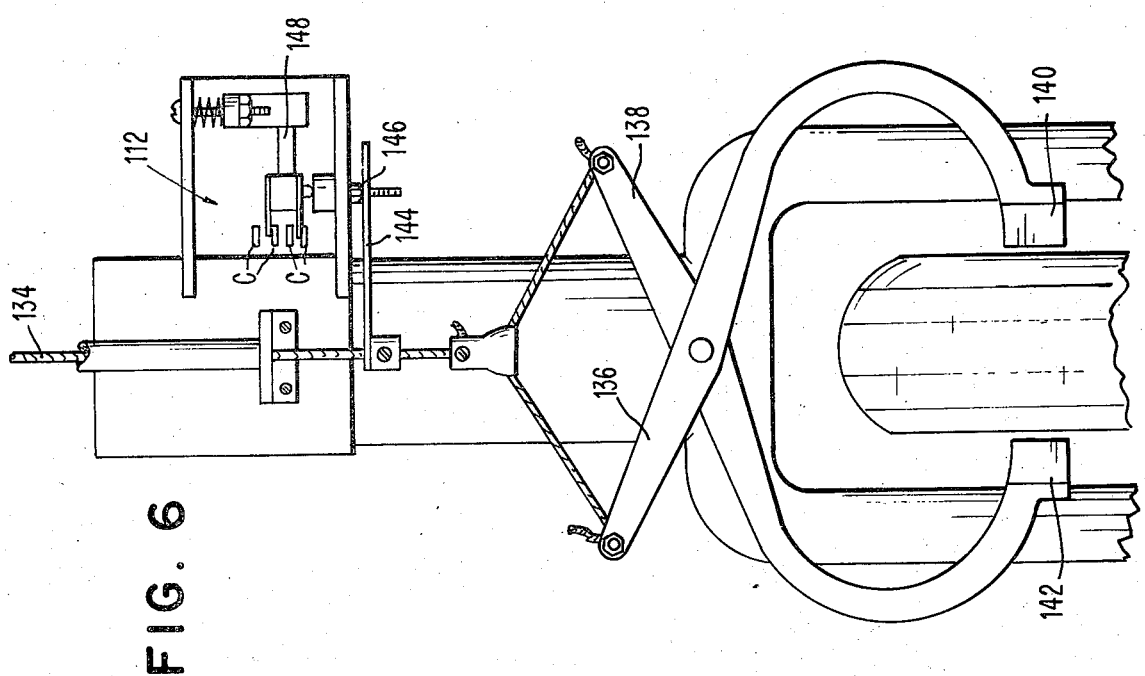
FIG. 6 is a showing of how the sensor element operates to activate the braking circuit employed in this invention.

A representative but not limiting implementation of the regenerative braking scheme is shown in FIG. 6. Its operation takes place when the cyclist moves hand brake lever 20 (see FIG. 1) so as to cause cable 134 to move upwards and actuate the tongs 136 and 138 so as to force their respective engaging tips 140 and 142 against the rim of rear wheel 12 so as to apply braking action thereto. In addition, the upward movement of cable 134 moves leaf spring 144 upwards so that is moves plunger 146 upwards to move insulator element 148, which supports and separates the contacts C of switch 112. Switch 112 (see FIG. 4) actuates interrupter module IM which is a function of pressure applied to hand brake lever 20 to begin the regenerative braking action discussed hereinabove, wherein battery 16 is being recharged during those intervals where braking takes place, permitting braking torques to have values that are safe and also serving to extend the lives of batteries that apply energy to motor 60 during those intervals when assistance is needed by the pedaller.

In summary, this invention has the very desirable feature of improving the electromotor assist by using only the latter when necessary, i.e., when pedalling against a strong wind, steep hill, rocky terrain, etc., thus diminishing the overuse of the battery 16, as well as employing regenerative braking when slowing down so that the life of the battery is extended, which in turn reduces the weight required for such battery.

We claim:

1. A pedal-operated vehicle having at least two wheels,
   a pedal gear and a gear attached to a first of said wheels,
   a drive chain connecting both said gears so that rotary pedal motion imparted by a driver of said vehicle to said pedal gear will cause said first wheel to rotate,
   a battery-powered motor attached to said vehicle and capable of imparting the same sense rotary motion to another wheel of said vehicle as said drive chain imparts to said first wheel,
   means for sensing increases in chain tension during pedalling of said vehicle,
   said chain tension sensing means comprising a plunger actuable by said drive chain and interposed between a source of light and and a light-sensing means, said plunger having a slit therein so that, when said chain tension increases, more of said slit becomes interposed between said light-sensing means and light source so as to increase the amount of light passing from light source to light-sensing means, and
   means connecting said chain tension sensing means to said motor so that increased chain tension will cause said motor to impart increased rotary motion to said other wheel during pedalling.

2. The pedal-operated vehicle of claim 1 wherein said light-sensing means is connected to a control circuit between said light-sensing means and said motor, and
   said control circuit including means to alter the amount of current going to said motor as a function of light reception of said light-sensing means.

3. A pedal-operated multi-wheeled vehicle having a chain-drive actuated by the pedalling of the vehicle operator to cause a wheel of said vehicle to rotate in a given sense,
   a battery-powered motor attached to said vehicle and capable of imparting, when actuated, the same sense rotary motion to one of said wheels on said vehicle, means for sensing chain tension and converting such sensed chain tension to driving currents to said battery-powered motor, a braking circuit for said vehicle that includes said motor, means for sensing the amount of braking being imparted by the pedaller to said vehicle and for converting said sensed braking into a substantially short circuit low resistant path for the windings of said motor, whereby any rotation of said motor while short-circuited generates a current that is opposite in direction to the current of the driving circuit for said motor so as to produce a braking action, and means for providing a discharge path of said motor current through the battery so as to charge the latter when such shorting action of the motor is terminated.

4. A pedal operated multi-wheeled vehicle having a chain-drive activated by the pedalling of the vehicle operator to cause a wheel of said vehicle to rotate in a given sense, a battery-powered motor attached to said vehicle and capable of imparting, when actuated, the same sense rotary motion to one of said wheels of said vehicle, a tension sensing circuit including means for sensing chain-drive tension, means for transmitting such sensed chain-drive tension to said motor so as to cause the latter to impart the same sense rotary motion to another said wheels, means for disabling said tension-sensing circuit when said vehicle operator applies braking action to said vehicle, and circuit means for short circuiting said motor periodically so as to cause reverse torque to be applied by said motor to one of said wheels and for returning currents generated by said motor to the battery upon termination of said short circuiting.

* * * * *